No. 618,628. Patented Jan. 31, 1899.
F. A. WALTER.
SEALED FOLDING HOLLOW BODY.
(Application filed May 10, 1898.)
(No Model.) 7 Sheets—Sheet 1.

WITNESSES:
J. Alex. Rennie
Arthur B. Huey.

INVENTOR.
Frederick A. Walter
BY
Wiedersheim & Fairbanks
ATTORNEYS

No. 618,628. Patented Jan. 31, 1899.
F. A. WALTER.
SEALED FOLDING HOLLOW BODY.
(Application filed May 10, 1898.)

(No Model.) 7 Sheets—Sheet 2.

WITNESSES:
J. Alex. Rennie.
Arthur B. Huey.

INVENTOR
Frederick A. Walter
BY
Biedenheim & Fairbanks
ATTORNEYS

THE NORRIS PETERS CO., PHOTO-LITHO., WASHINGTON, D. C.

No. 618,628. Patented Jan. 31, 1899.
F. A. WALTER.
SEALED FOLDING HOLLOW BODY.
(Application filed May 10, 1898.)
(No Model.) 7 Sheets—Sheet 3.

WITNESSES.
J. Alex. Rennie
Arthur B. Huey

INVENTOR
Frederick A. Walter
BY
Wiedersheim & Fairbanks
ATTORNEYS

No. 618,628. Patented Jan. 31, 1899.
F. A. WALTER.
SEALED FOLDING HOLLOW BODY.
(Application filed May 10, 1898.)

(No Model.) 7 Sheets—Sheet 4.

WITNESSES:
INVENTOR
Frederick A. Walter
BY
Wiederheim & Fairbanks
ATTORNEYS

No. 618,628. Patented Jan. 31, 1899.
F. A. WALTER.
SEALED FOLDING HOLLOW BODY.
(Application filed May 10, 1898.)
(No Model.) 7 Sheets—Sheet 5.

WITNESSES:
INVENTOR
Frederick A. Walter
BY
ATTORNEYS.

No. 618,628. Patented Jan. 31, 1899.
F. A. WALTER.
SEALED FOLDING HOLLOW BODY.
(Application filed May 10, 1898.)
(No Model.) 7 Sheets—Sheet 6.

WITNESSES:
J. Alex Rennie
Arthur B. Hurry

INVENTOR
Frederick A. Walter
BY
Diederstein & Fairbanks
ATTORNEYS

No. 618,628. Patented Jan. 31, 1899.
F. A. WALTER.
SEALED FOLDING HOLLOW BODY.
(Application filed May 10, 1898.)

(No Model.) 7 Sheets—Sheet 7.

WITNESSES:
J. Alex. Rennie.
Arthur B. Huey.

INVENTOR
Frederick A. Walter
BY
Diedersheim & Fairbanks
ATTORNEYS

THE NORRIS PETERS CO., PHOTO-LITHO., WASHINGTON, D. C.

UNITED STATES PATENT OFFICE.

FREDERICK A. WALTER, OF PHILADELPHIA, PENNSYLVANIA.

SEALED FOLDING HOLLOW BODY.

SPECIFICATION forming part of Letters Patent No. 618,628, dated January 31, 1899.

Application filed May 10, 1898. Serial No. 680,262. (No model.)

*To all whom it may concern:*

Be it known that I, FREDERICK A. WALTER, a citizen of the United States, residing in the city and county of Philadelphia, State of Pennsylvania, have invented a certain new and useful Improvement in Sealed Folding Hollow Bodies, which improvement is fully set forth in the following specification and accompanying drawings.

My invention relates to that class of sealed folding hollow bodies or receptacles which are intended for use in the systematic collection for missionary, Sunday-school, church, charitable, and other beneficent purposes in which certain practical conditions must be combined to insure success—*i. e.*, each receptacle should be formed into a symmetrical or geometrical figure, such a receptacle or figure to stand erect and be strong and rigid when in use and should be so constructed that its contents cannot be shaken out or be extracted without injury to the particular receptacle, the latter to be so constructed as to readily fold for transportation, and it must be produced at a minimum of cost. To attain these several conditions is the object of the present invention, which consists in the novel features of construction and arrangements of parts, all as will be hereinafter fully described, and particularly pointed out in the claims.

Figure 1 represents a perspective view of a parallelepiped sealed hollow body or receptacle embodying my invention, the same being shown as provided with a gable-roof. Fig. 2 represents the blank from which the body or receptacle is formed, the same being spread out and scored or creased. Fig. 3 represents, in side elevation, the body or receptacle after having been constructed, sealed, and folded for transportation. Fig. 4 represents an end elevation of Fig. 3, which for clearer illustration is only partially folded. Figs. 11 to 14, inclusive, also represent similar views to those already described; but in this instance the body or receptacle is shown in the form of a cube and being further provided with a hip end roof. Figs. 19 to 22, inclusive, represent similar views to Figs. 15, 16, 17, and 18, above described, and show substantially the same construction of body or receptacle, the only difference being in the scoring or creasing of the base.

Similar letters of reference indicate corresponding parts in the figures.

Referring to the drawings, the invention will be first described with especial reference to Figs. 1 to 6, inclusive, wherein Fig. 2 designates a blank of any suitable flexible material cut into the irregular shape, substantially as shown, and then scored or creased, as indicated by the dotted lines, the scoring or creasing being accomplished by any suitable means and being of such a character as to permit of the material being readily folded at the lines so scored.

The blank is provided at one side with an extension $a$, to which glue or other adhesive material is applied, after which the blank is folded on the lines marked $x$ to form a parallelepiped body or receptacle, while the glued extension $a$, adhering to the opposite side $a'$ of the blank, serves to bind the same together. Two sides of the body or receptacle still remain open and are closed and sealed in the following manner: The blank is provided upon those portions thereof which lie upon either side of the sides abutting the base with oppositely-disposed slits or incisions $a^2$ $a^4$ and tongues $a^3$ $a^5$, which when the receptacle or body is properly folded constitute locking devices to secure the said sides of the receptacle or body. After the sides have been properly folded and interlocked, as described, the part $a^6$ of the blank is folded over $a^2$ and $a^3$, while the part $a^7$ is folded over $a^4$ and $a^5$. The part $a^8$ is now folded under $D^2$, and thus forms a flexible guard or protection under the incision at $a^{14}$.

The parts $a^6$ and $a^7$ have holes cut into them at $b^6$ and $b^7$, and their width is somewhat reduced, so that when glue is applied to the parts $a^9$ and $a^{10}$ the several parts adjacent thereto will be glued together by reason of the glue that will pass through the holes $b^6$ and $b^7$ and flow over the reduced sides of the parts $a^6$ and $a^7$, as will be readily understood, which last operation completes the sealing of the hollow body or receptacle.

The roof $a^{11}$ is now folded or bent upon the dotted lines (indicated in Fig. 2 and marked $x'$.) The gable ends $a^{13}$ may be constructed by applying glue in the right angles inclosed by the dotted scoring-lines $a^{16}$, or these gable ends may be allowed to project beyond the ends of the body or receptacle, as indicated in dotted lines, Fig. 1. Again, by properly scoring or creasing the ends of the roof a hip-roof effect may be produced instead of the gable just described. The roof $a^{11}$ is provided with a segmental flap or extension $a^{12}$, the extreme ends of which extend slightly beyond the point where they merge from the edge of the roof, and it is intended that this flap or extension shall be inserted into the incision $a^{14}$, and thus form a double protecting guard, effectually preventing the contents of the body from shaking out or extraction.

In order to fold this sealed hollow body or receptacle for purposes of transportation, the flap or extension $a^{12}$ is withdrawn from the incision $a^{14}$ and the roof $a^{11}$ is folded against $a^{10}$, after which the bottom $D'$ and the ends $c'$ and $c^2$ are simultaneously pressed inwardly. This will cause $c^3$ and $c^4$ to press outwardly and upwardly, as clearly shown in Figs. 3 and 4. To unfold this sealed hollow body or receptacle, the sides $a^9$ and $a^{10}$ are drawn away from each other and the top $D^2$ is pressed down, after which the segmental tongue or extension $a^{12}$ is again inserted and buckled into the incision $a^{14}$.

Figure 5:
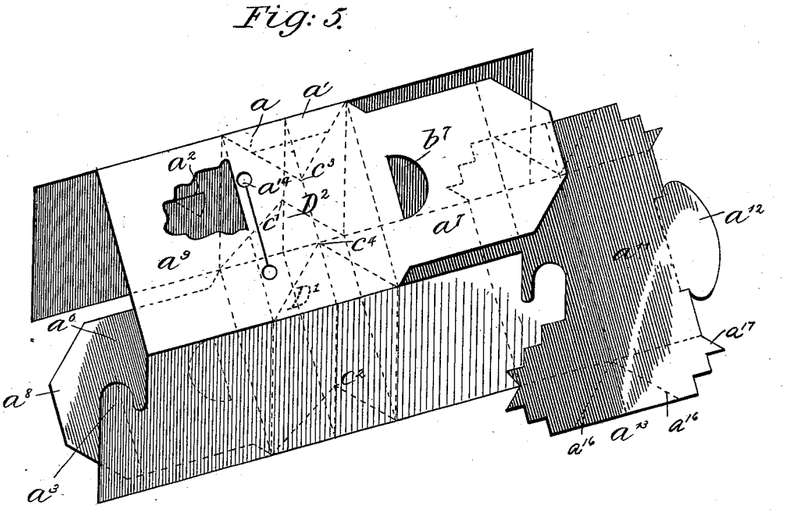
Fig. 5 represents a perspective view showing the same in a partially-sealed state.
Figure 6:
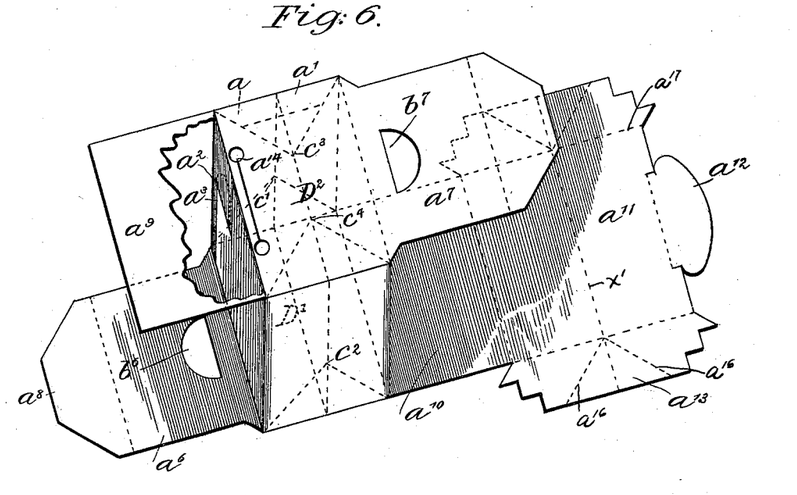
Fig. 6 represents a similar view, but showing the same in a still further advanced stage of completion, a portion thereof being broken away to show parts which would otherwise be concealed.
Figures 7, 8, 9, 10:
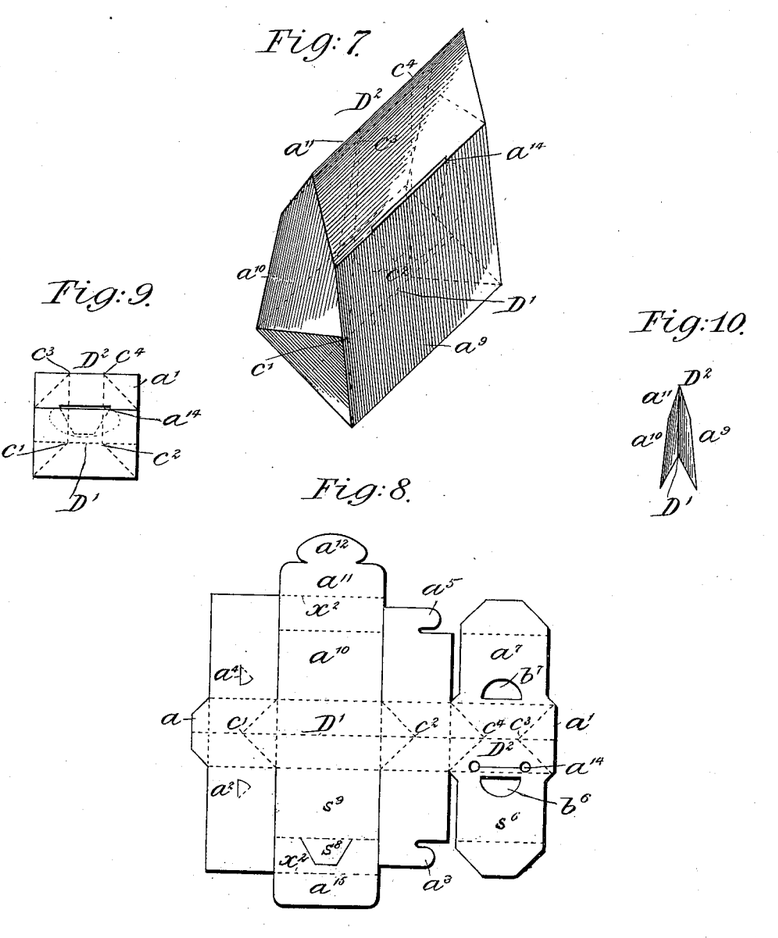
Figs. 7 to 10, inclusive, represent similar views to Figs. 1, 2, 3, and 4, above described, and show substantially the same construction of body or receptacle, the only difference being in the formation or shape of roof.

Referring now to Figs. 7 to 10, inclusive, it will be found that the construction is practically the same as that just described, except that the parts $a^6$ and $a^9$ of Fig. 2 are transposed, as shown clearly in Fig. 8, and the part $s^9$ is also shown cut to form a tongue $s^8$, which is adapted to fold over $a^2$, $a^3$, and $s^6$ and pass through the incision $a^{14}$ in a similar manner to the segmented flap or extension $a^{12}$, which latter is also inserted in $a^{14}$, as previously described. The roof $a^{11}$ differs somewhat from that described with relation to Figs. 1 to 4 in that its ends are flush with the ends of the sealed hollow body or receptacle and at the juncture of the roof the sides of the receptacle are slightly contracted, causing the ends $c'$ and $c^2$ at that point to dip inwardly, as clearly shown by dotted lines in Fig. 7.

In Fig. 8, $a^{15}$ designates an extension of the part $a^9$ and folds backwardly over and upon the top $D^2$ and $a^{11}$ folds down upon this extension, and then the segmental flap or extension $a^{12}$ is inserted into the incision $a^{14}$, the dotted lines $x^2$ $x^2$ forming the apex of the roof.

It will be understood, of course, that glue or other adhesive matter is applied to the several parts, as hereinbefore fully described, in order that the hollow body or receptacle may be securely sealed.

To fold this sealed hollow body or receptacle, it is only necessary to exert a slight pressure upon the lower edges of the sides $a^9$ and $a^{10}$, which will cause the bottom $D'$ and the ends $c'$ and $c^2$ to move inwardly and the top, with the roof, to rise, as shown in Figs. 9 and 10, a manipulation in the opposite direction serving to restore the hollow body or receptacle to its proper shape for use.

Figs. 11 to 14, inclusive, show another form of my invention, its shape being that of a cube; but the general configuration of the blank and its mode of fastening are substantially the same as those already described, except that the extension which forms the roof is changed so as to produce a roof hip-ended in character, as clearly shown—namely, the roof $a^{11}$ is folded in the center through $x'$ between $a^{13}$ and $a^{13}$, the angles inclosed by the lines $a^{16}$ are folded inwardly and under the roof $a^{11}$ and, thus produce the angles of the roof as shown in Fig. 11—namely, a roof having a square base and hip-sided on all four sides, or, in other words, a cubical body surmounted by a pyramidal roof, although by properly scoring said extension an open-ended ridge or gable-ended roof may as easily be produced, as will readily be understood by reference to Figs. 1 and 10 and more specifically Figs. 1 and 7. The sealing of this hollow body or receptacle and its folding for purposes of transportation are accomplished in a similar manner to that described in Figs. 1 to 4.

Figures 15, 16, 17:
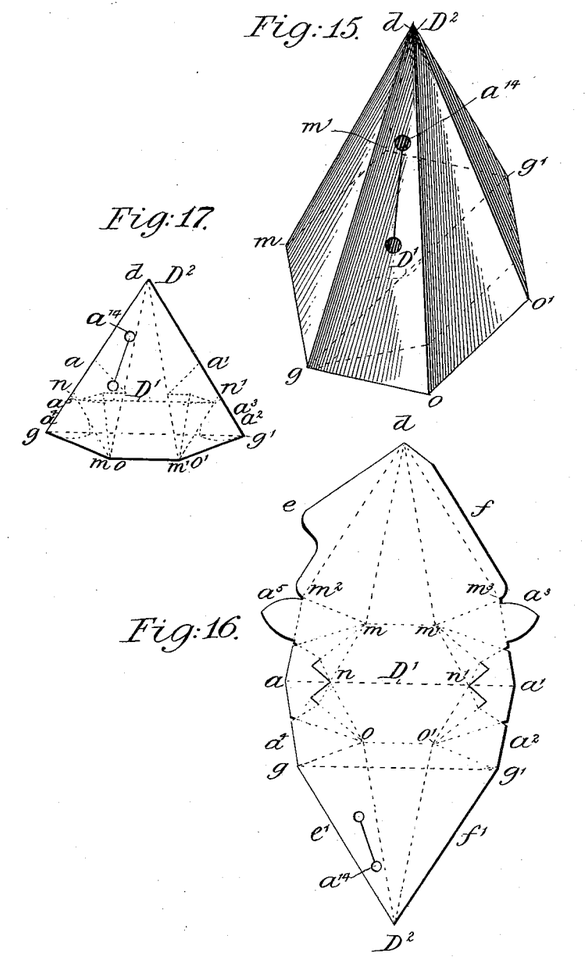
Fig. 15 represents a perspective view of a sealed hollow body or receptacle representing a hexagon pyramid.
Fig. 16 represents the blank from which the body or receptacle is formed, the same being spread out and scored or creased.
Fig. 17 represents, in side elevation, the body or receptacle after having been constructed, sealed, and folded for transportation.
Figure 18:
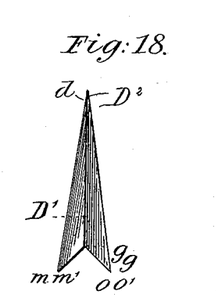
Fig. 18 represents an end elevation of Fig. 17, which for clearer illustration is only partially folded.

Figs. 15 to 18 represent a sealed folding hollow body or receptacle in the form of a hexagon pyramid made from one piece of flexible material cut in the precise shape as shown in Fig. 16 and scored or creased, as indicated by the irregular dotted lines, when it is ready to be sealed. The parts $a$ and $a'$ of the blank, Fig. 16, are each provided with a W-shaped cut or incision $n$ and $n'$, and if the blank at the points $a$ and $a'$ is taken hold of and pressed together in the direction of $D'$ this motion will contract all the angles formed by $m^2$, $m$, $m'$, $m^3$, and $d$ toward $g$, $o$, $o'$, $g'$, and $D^2$. The pyramid is now folded upon the line $D'$, which extends through the base, and substantially as shown in Fig. 17, with these exceptions. Take $D^2$ and turn it backward at $g$ and $g'$, where they lie, respectively, over $m^2$ and $m^3$. Now fold the locking devices $a^5$ and $a^3$ over $a^4$ and $a^2$ and take $e$ and fold it over $a^5$ and $a^4$, and also fold $f$ over $a^3$ and $a^2$, after which glue is applied along the edges of $e'$ and $f'$ from $g$ to $D^2$ and from $D^2$ to $g'$, and then $D^2$ is turned forward again upon $d$, $g$ upon $m^2$ and $g'$ upon $m^3$, thus securely sealing the pyramid, as is shown in Figs. 17 and 18. To erect or unfold this pyramid, it is sufficient to press upon the points $g$ and $g'$, Fig. 17, by which motion $n$ is brought into position with $m^2$ and $g$, and $n'$ with $m^3$ and $g'$. By omitting the creasing or scoring from the base to the apex of the two lines on each side between the two glue-joints the sides will present the appearance of two semicones glued together at their outer edges.

Figs. 19 to 22, inclusive, represent a hexagon pyramid, which is substantially the same in its construction as that just described, excepting that the lines marked $x^3$ in Fig. 20 are continued so as to cross the line between $a$ and $a'$ from $o'$ and $m'$ to $a'$, and from $o$ and $m$ to $a$, thus omitting the W-shaped cut which is made use of in Fig. 16, the folding and gluing of this pyramid being effected in a similar manner as already described in Figs. 15 to 18.

Figs. 23 to 26, inclusive, represent a pyramid whose base is a square, its construction being substantially similar to that described with reference to Figs. 19 to 22, inclusive, except that the lines marked $x^3$ thereon meet on the line between $a$ and $a'$, two at $b^2$ and two at $b^3$, respectively, while the four lines marked $y$ meet two in $a$ and two in $a'$, respectively.

Figures 23, 24, 25, 26:
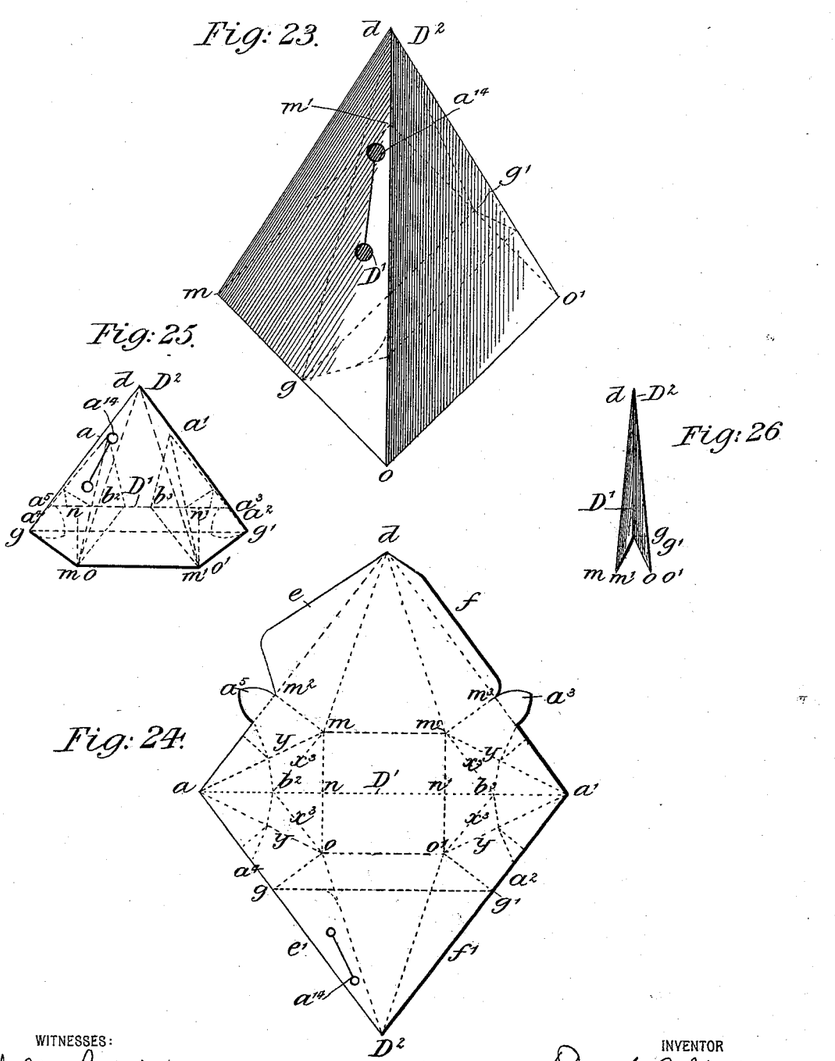
Figs. 23 to 26, inclusive, also represent similar views to those last described; but in this instance the body or receptacle is shown as having a square base.

It will be observed that the incision $a^{14}$, as shown in the pyramidal figures, is made on a line taken from the base in the middle of the angle formed in Figs. 16, 20, and 24 by $g$, $o$, and $D^2$, terminating at each end in a small opening and protected on the under and inner side by the guard $e$.

It will thus be seen that my invention provides in a simple and inexpensive manner a sealed folding hollow body or receptacle which is particularly well adapted for the purposes intended and which is so arranged that its contents when once inserted cannot be easily extracted by shaking or otherwise, and although I have shown but six forms, it is obvious other forms might be designed, and I therefore reserve the right to make such changes and alterations as may be held to come within the spirit and scope of my invention.

Having thus described my invention, what I claim as new, and desire to secure by Letters Patent, is—

1. A sealed folding hollow body or receptacle made in one piece of flexible material, cut and scored or creased as described, having locking devices adapted to securely fasten the sides together, sealed and folded as described, containing an incision through which offerings may be passed and a flap or extension forming an internal guard to prevent the extraction or egress of the contents of said hollow body.

2. A sealed folding hollow body or receptacle as hereinbefore described composed of one piece of any suitable kind of flexible material, cut and scored or creased in the form substantially as shown, with locking devices adapted to securely fasten the sides together, sealed and folded as described, having an incision through which offerings may be passed and a flap or extension arranged to lie beneath said incision, forming an internal guard, with an extension to form a roof of any one of the forms described and a flap or segmental extension made integral with the roof and adapted to enter said incision to form an additional guard to prevent the egress of the contents.

3. A sealed folding hollow body or receptacle as hereinbefore set forth, consisting of a single piece of flexible material, cut and scored or creased as indicated, containing locking devices adapted to engage with opposite sides of said body and securely fasten said sides together, having openings in said locking devices or sides adjacent thereto or both, through which glue may pass, and their ends shortened so that any suitable adhesive material may freely pass thereover and beyond and come in contact with the adjacent parts, sealed and folded in the manner described, with an incision for the reception of articles and an extension or flap forming an internal guard beneath said incision, having an extension to form a roof as described containing a segmental extension or flap being integral with the roof, and intended to enter said incision to hold the roof in position and form an additional guard to prevent the egress of the contents of said hollow body.

4. A sealed folding hollow body or receptacle as hereinbefore set forth, constructed of one piece of any kind of flexible material, with or without an extension to form a roof, cut and scored or creased as indicated, containing locking devices adapted to securely fasten the sides together, having openings in said locking devices or sides adjacent thereto or both, through which any adhesive substance may pass, said locking devices or sides having their ends shortened so that glue may freely pass thereover and beyond and come in contact with the adjacent parts, and be sealed as described, containing an incision for the reception of articles and an extension or flap forming an internal guard adapted to lie beneath said incision, having central folds through the base and the abutting sides and top abutting said side and said folds lying in the same vertical plane, with the diagonal auxiliary folds in said sides diverging from the corners of the base to the central fold in the abutting sides, and the diagonal auxiliary folds in the top diverging from the corners to the central fold thereof, whereby said sealed hollow body may be folded flat as described.

5. A sealed folding hollow body or receptacle as hereinbefore described, composed of one piece of flexible material, cut and scored or creased as described, having extensions forming locking devices adapted to engage with opposite sides of said body or receptacle holding the sides together, with an incision for the reception of articles and an extension or flap lying beneath said incision forming an internal guard, having a central fold through the base passing through the auxiliary sides adjacent, containing auxiliary folds outside of said base constituting internal safety devices when sealed or folded as described.

FREDERICK A. WALTER.

Witnesses:
   GEO. R. GOODMAN,
   JAMES A. WORDEN.